Patented June 29, 1926.

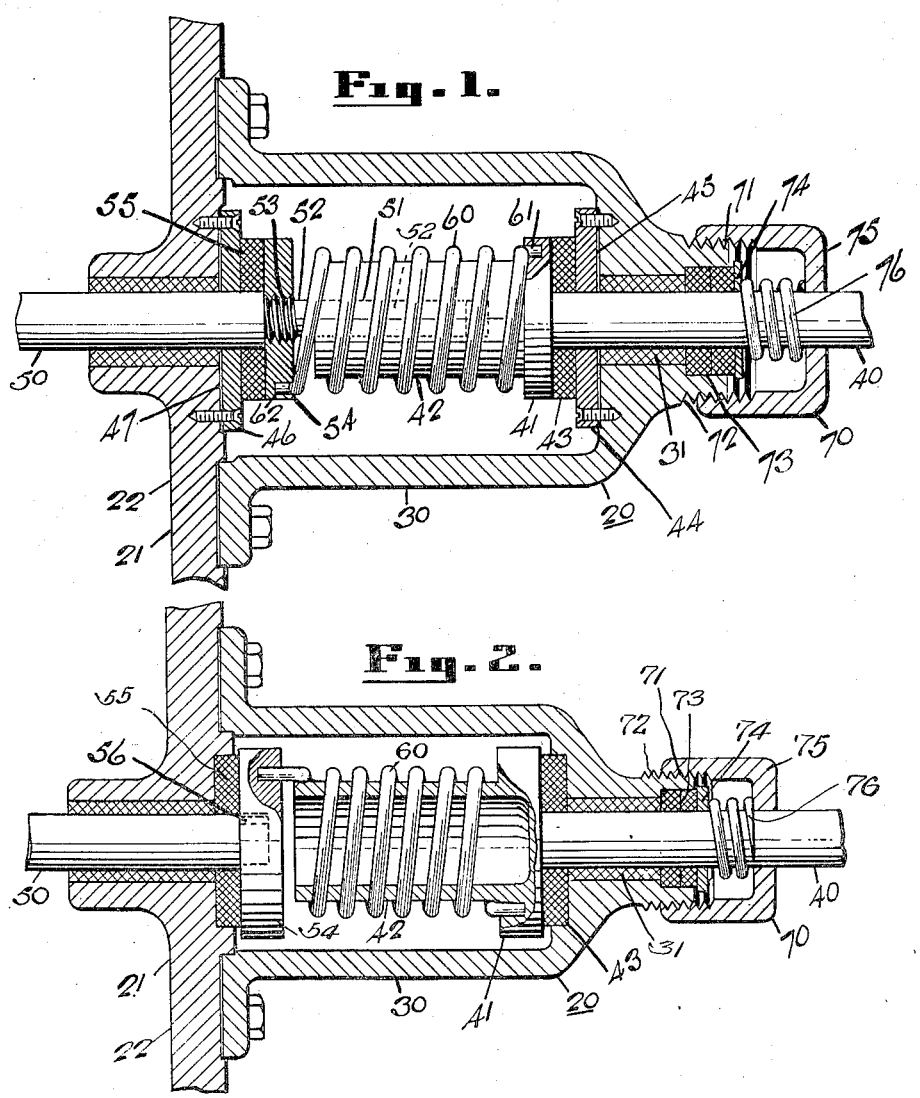

1,590,834

UNITED STATES PATENT OFFICE.

JESSE G. KING, OF DAYTON, OHIO, ASSIGNOR, BY MESNE ASSIGNMENTS, TO GENERAL MOTORS RESEARCH CORPORATION, OF DAYTON, OHIO, A CORPORATION OF DELAWARE.

SEALING DRIVE.

Application filed October 15, 1920. Serial No. 417,152.

The present invention relates to motion-transmission mechanism including a sealing drive or stuffing box particularly adapted for rotary drive pumps and the like, preferred forms of which have been chosen as convenient for the purposes of description and explanation.

It is a recognized fact concerning pumps, especially of the compressor type which discharge fluid under pressure, that leakage occurs from the high pressure to the low pressure chamber when the pump is stopped. Unless a stuffing box for the drive shaft is provided which will prevent leakage from the low pressure chamber to the outside of the pump, a constant loss of fluid will result. It would be a comparatively easy matter to increase the pressure upon packing around the drive shaft to a point where leakage of fluid to the outside of the pump would be stopped, but such a pressure would result in excessive friction for the shaft, when in operation. The conditions mentioned are especially true for rotary drive compressors used in refrigerating systems wherein a gaseous fluid is utilized. In such systems as soon as the compressor is stopped the low pressure side assumes and retains the pressure of the high pressure side. Thus if there be a leakage to the exterior of the compressor, a constant loss of refrigerant will result.

It is among the objects of the present invention, therefore, to provide a sealed drive for a rotary shaft which will prevent leakage of fluid through the journal, but still exert a minimum of friction on the shaft during operation thereof.

Further objects and advantages of the present invention will be apparent from the following description, reference being had to the accompanying drawing, wherein preferred embodiments of the present invention are clearly shown.

In the drawings:—

Fig. 1 is a view partly in section and partly in elevation of one preferred form of sealing drive showing more particularly the drive therethrough.

Fig. 2 is a view partly in section and partly in elevation of another preferred form of sealing drive showing certain modifications therein.

Referring to the drawings and more particularly to Fig. 1, the sealing drive, designated as a whole by the numeral 20, is secured to the wall 21 of a pump or compressor casing 22 by means of suitable stud bolts as shown.

The drive includes a housing 30 which is adapted to be secured to the wall 21 and which has a suitable bearing surface 31 for the drive shaft 40.

The drive shaft 40 has a collar 41 formed on its driving end. Integral with the collar is an extended portion or drum 42 adapted to form a guide, the purpose of which will be explained later. This collar forms a gland for the packing or sealing element 43. The packing may be any suitable kind for the type of pump upon which it is to be used, but for the present purpose, namely, use on a refrigerator compressor, a metallic packing or seal is preferable. A plate 44, secured to the housing 30 retains a gasket 45 tightly in place, for the purpose of further preventing leakage. The plate 44, consequently, forms an abutment for the packing 43, as shown in the drawing.

A similar plate 46 and gasket 47 are used at the wall 21 around the driven shaft 50.

The extended portion or drum 42 is hollowed out to form a guide 51 for the extension 52 of the driven shaft 50. This hollowed portion 51 not only guides the shaft 52 but permits its free rotation therein.

The shaft 50 has a threaded portion 53 adapted for securing the collar 54 thereto. The collar 54 has similar functions as the collar 41, acting as a gland for the packing or seal 55.

A resilient member 60, preferably some form of spring, is secured at its one end to the collar 41 at 61, and at its other end to the collar 54 at 62. The spring is adapted to transmit the motion of the drive shaft 40 to the driven shaft 50.

Referring to Fig. 2, the driven shaft 50 is not guided in the extended portion or drum 42 of the shaft 40. Further, the plates 44 and 46 with the corresponding gaskets are omitted, allowing the packing or sealing elements 43 and 55 to be held against the housing 30 and the wall 21. The collar 54 may be secured to the shaft 50 by means of a key 56. This latter form of sealed drive is simpler than the one previously described, and performs the same operations equally as well.

In both forms the extended portion or drum 42 acts as a guide for the resilient element 60; also both forms have auxiliary packing means 70 secured around the drive shaft 40 by means of threaded portion 71 of cap 75 coacting with threaded portion 72 of the housing 30.

This packing means consists of the packing elements 73 held in place by means of the washer 74 contained in the adjusting cap 75.

The pressure on the packing 73 is controlled by means of the spring 76, the tension of which may be adjusted by turning the cap 75.

The operation of the sealed drive is as follows:

In starting up the compressor, the drive shaft 40 imparts a rotary motion to the resilient element 60. This element is so installed that clock-wise rotation of the shaft causes its contraction to reduce the pressure on the packing or sealing elements 43 and 55 caused by the resilient element itself. Further, the resilient element imparts this motion to the driven shaft 50 which in turn operates the compressor. As soon as the rotative force on the driving shaft 40 is discontinued, the resilient element 60 expands and presses the collars 41 and 54 strongly against the packing or sealing elements 43 and 55 to prevent leakage around the shafts.

In a compressor employed in a refrigerating system, the pressure varies considerably depending on whether the compressor is in operation or not. Thus when the compressor is in operation, the pressure therein, that is, the pressure on the left side of the wall 21 shown in the drawings, is relatively low and in certain systems is substantially atmospheric. Hence, during the operation of the compressor, there is little or no difference in pressure between interior and the exterior thereof, and consequently little tendency for the leakage of gas either from or into the compressor about the shaft 50. However, when the compressor is brought to a stop, the pressure within the refrigerating system soon equalizes and a relatively high pressure is built up within the compressor tending, of course, to cause a leakage of gas about the shaft 50. It will be observed that in the present invention, advantage is taken of the low pressure within the compressor during operation, to relieve the pressure on the packing or sealing elements thereby reducing materially the losses due to friction, and that when the compressor is at rest and the pressure therein is high, additional pressure is exerted on the packing or sealing elements to effectively seal the compressor against leakage of gaseous fluid.

The present invention has the further advantage that the driving takes place through a closed stuffing box housing having double packing or sealing means. With such a construction, before any gas can escape from the compressor to the atmosphere, it must leak through both packing or sealing means, with the probability that it will not leak through both but will build up a pressure within the stuffing box housing. Any gas which has escaped from the compressor and built up a pressure in the stuffing box housing when the compressor is at rest, will tend to return to the compressor when it is put into operation and the pressure reduced on the interior thereof.

If, however, conditions are such that under normal conditions of compressor operation the pressure on the interior thereof is above atmospheric, a similar spring of greater stiffness may be utilized to provide sufficient pressure upon the packing or sealing means, while the compressor is in operation, to prevent leakage through the sealed drive.

Although the invention has been described relative to adaptation and operation on a refrigerating type of compressor, it is to be understood that these forms of sealed drive and equivalents thereof might be used on any machine requiring a sealed drive for similar purposes.

What I claim is as follows:—

1. A sealing drive comprising, in combination, a shaft bearing, a shaft journaled in said bearing, a member for sealing said bearing, a second shaft, and a motion-transmitting member connecting the shafts and having provisions for exerting pressure upon the sealing member.

2. A sealing drive comprising, in combination, a shaft bearing, a shaft journaled in said bearing, a member for sealing said bearing, a second shaft, and a motion-transmitting member connecting the shafts and having provisions for exerting a pressure upon the sealing member which varies with the operations of the shaft.

3. A sealing drive comprising, in combination, a shaft bearing, a shaft journaled in said bearing, a member for sealing said bearing, a second shaft, and a yielding motion-transmitting device connecting the shafts and having provisions for exerting yielding pressure upon the sealing member.

4. A sealing drive comprising, in combination, a shaft bearing, a shaft journaled in said bearing, a member for sealing said bearing, a second shaft in alignment with the first shaft, and a coiled spring connecting the shafts and having one of its ends bearing against the sealing member.

5. A sealing drive comprising, in combination, a frame, a bearing in said frame, a shaft in said bearing, a sealing member provided by the wall around the bearing, a packing disc attached to the shaft and adapted to engage the sealing member on the wall, a second shaft in alignment with the first shaft, and a coiled spring connecting the shafts and having one end connected with the packing disc.

6. A sealing drive comprising, in combination, a casing adapted to contain a fluid under pressure; a first shaft extending from said casing through an opening in the wall thereof; a second shaft; a spring interposed between said first and second shafts, for transmitting motion between the shafts; a stuffing box surrounding said first shaft; packing elements associated with said stuffing box for preventing a flow of fluid from said casing; and means cooperating with said opening for reducing the packing effect of said packing elements when motion is transmitted between the shafts.

7. A sealing drive comprising, in combination, a wall having an opening therethrough; a shaft extending through said opening and rotatable therein; two annular sealing members surrounding said shaft and one of which is secured to and rotates therewith, while the other of said members is fixedly secured to said wall; a spring engaging the sealing member aforesaid carried by said shaft and adapted to press the same against the sealing member carried by the wall; and a rotatable member operatively connected with said spring which transmits motion between the shaft and the rotatable member.

8. A sealing drive comprising, in combination, a wall having on opening therethrough; a shaft extending through said opening and adapted to rotate therein, cooperating sealing surfaces carried by said shaft and said wall and adapted when in engagement to seal said opening; and means for pressing said surfaces into engagement, said means being responsive to the rotation or non-rotation of the shaft for varying the pressure on the sealing surfaces, and said means comprising a drum and a helical spring wound about the drum, the helical spring being secured to the shaft and adapted to transmit power when the shaft is in rotation.

9. A sealing drive comprising, in combination, a rotatable shaft; a second rotatable shaft; packing elements for each of said shafts; and a motion-transmitting member connecting the two shafts, said member exerting proper pressure upon the packing elements of said shafts when they are inoperative and relieving said pressure when the member is transmitting motion from one shaft to the other.

10. A sealing drive comprising, in combination, a rotatable shaft; a second rotatable shaft; packing elements for each of said shafts; and a torque element connecting both shafts and exerting endwise pressure of one degree upon the packing elements when the shafts are inoperative, said torque element contracting and relieving the said pressure on the packing elements when it is transmitting torque from one shaft to the other.

11. In a device of the character described, the combination with a wall having an opening therein; a shaft extending through said opening and rotatable therein; a housing secured to said wall and provided with a bearing; a second shaft journaled in said bearing, said shaft being in axial alignment with the first shaft; a collar carried by and secured to each of the shafts within said housing; a packing element interposed between the disc and wall and surrounding the first shaft; another packing element interposed between the disc and housing and surrounding the second shaft; and a spring having one end secured to one disc and the other end secured to the other disc, said spring being adapted to transmit rotary motion from one shaft to the other and to exert endwise pressure at a proper degree upon the discs and thereby press the packing elements against their respective wall and housing when the shafts are inoperative, and exert a lesser pressure against said discs when said spring is transmitting rotary motion.

In testimony whereof I hereto affix my signature.

JESSE G. KING.